United States Patent [19]

Inoue

[11] Patent Number: 4,476,369

[45] Date of Patent: Oct. 9, 1984

[54] EDM METHOD OF AND APPARATUS FOR MACHINING CAVITIES USING A PLURALITY OF INDEPENDENTLY MOVABLE SEGMENTED ELECTRODES

[75] Inventor: Kiyoshi Inoue, Tokyo, Japan

[73] Assignee: Inoue-Japax Research Incorporated, Yokohama, Japan

[21] Appl. No.: 433,003

[22] Filed: Oct. 6, 1982

[30] Foreign Application Priority Data

Oct. 8, 1981 [JP] Japan .................. 56-160477

[51] Int. Cl.³ ............................................. B23P 1/12
[52] U.S. Cl. ............................ 219/69 M; 219/69 E; 219/69 V
[58] Field of Search ................ 219/69 E, 69 M, 69 G, 219/69 R, 69 V; 204/129.5, 129.7, 222

[56] References Cited

U.S. PATENT DOCUMENTS

| | | | |
|---|---|---|---|
| 2,783,411 | 2/1957 | Matulaitis | 219/69 G |
| 3,372,099 | 3/1968 | Clifford | 219/69 E |
| 3,467,807 | 9/1969 | Livshits et al. | 219/69 V |
| 3,740,519 | 6/1973 | O'Connor | 219/69 E |
| 4,233,485 | 11/1980 | Sato et al. | 219/69 M |

FOREIGN PATENT DOCUMENTS 2842525 4/1979 Fed. Rep. of Germany .... 219/69 E
704745 12/1979 U.S.S.R. .......................... 219/69 E

*Primary Examiner*—Roy N. Envall, Jr.
*Assistant Examiner*—Geoffrey S. Evans
*Attorney, Agent, or Firm*—Karl F. Ross; Herbert Dubno

[57] ABSTRACT

An EDM method of and apparatus for machining the surfaces of a cavity in an electrically conductive workpiece utilize an electrode assembly comprising a plurality of segmented electrodes having their respective machining surfaces which collectively form a contour corresponding in shape to the cavity and being supported so as to be spaced apart and movable relative to each other in the assembly. An EDM power supply is used to electrically energize the segmented electrodes individually with respect to the workpiece and a plurality of drive units are provided to individually displace the segmented electrodes, independent of one another, relative to the workpiece, along their respective predetermined paths of translational motion, thereby permitting electrical discharges to develop between each of the surfaces of the cavity and the machining surface of each of the segmented electrodes brought proximate thereto across a fluid-filled machining gap during the individual translational motion thereof.

11 Claims, 3 Drawing Figures

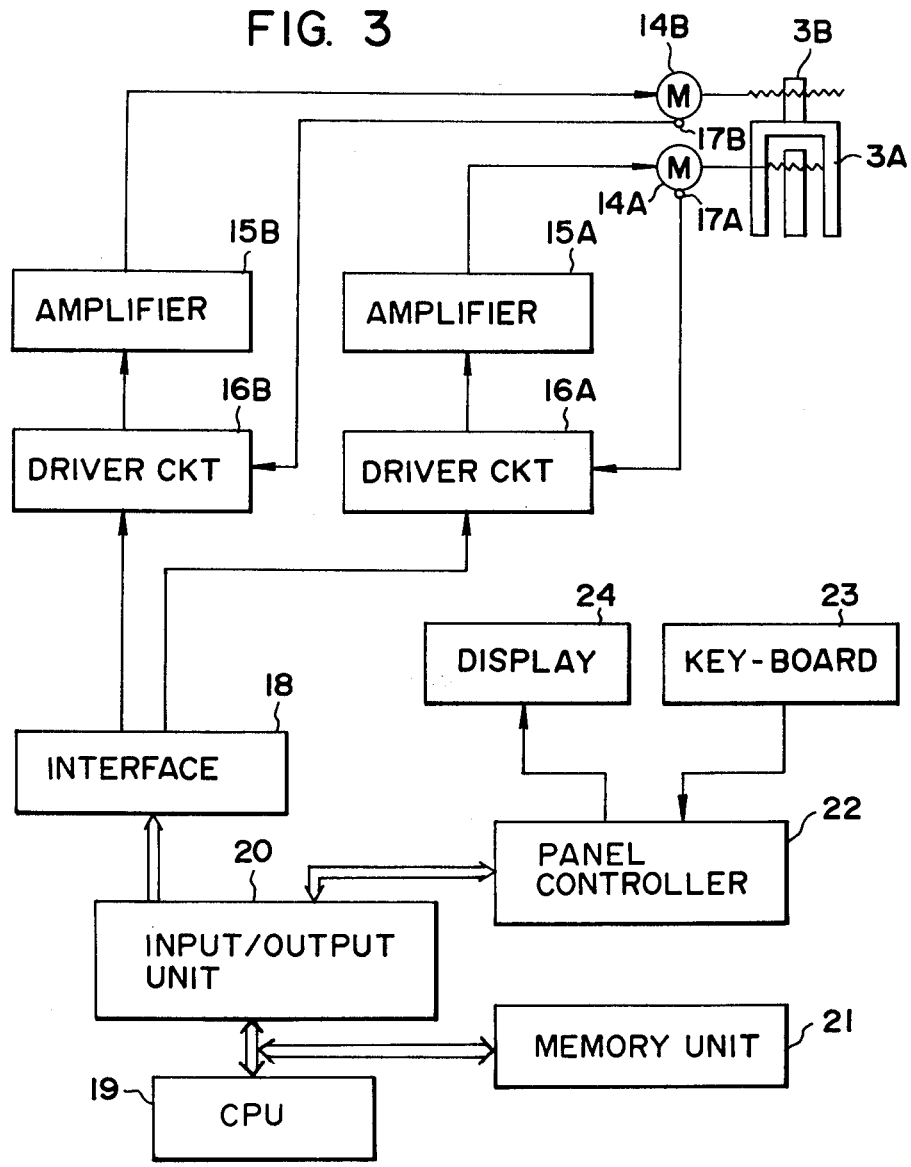

EDM METHOD OF AND APPARATUS FOR MACHINING CAVITIES USING A PLURALITY OF INDEPENDENTLY MOVABLE SEGMENTED ELECTRODES

Field of the Invention

The present invention relates generally to EDM (electrical discharge machining) and, more particularly, to a new and improved method of and apparatus for machining by electrical discharges the surfaces of a cavity previously machined in an electrically conductive workpiece by electrical discharges or otherwise.

Background of the Invention

In the EDM field, it is well known that the surfaces of a cavity or recess which was rough-machined in an electrically conductive workpiece by EDM while moving a tool electrode which corresponds in shape to the cavity in the direction of an axis of penetration thereof into the workpiece may be finish-machined by EDM while translationally displacing the tool electrode and the workpiece relative to each other according to a cyclical or orbiting motion in a plane orthogonal to the axis of penetration. It has also been proposed to move, in this connection, the tool electrode and the workpiece relative to one another both in the direction of the axis of penetration of the tool electrode in the workpiece and in a plane orthogonal to this axis. In these manners, a single electrode may be used both to rough-machine a workpiece and to obtain a high-precision finish of the surfaces of the rough-machined cavity in the workpiece.

When, however, the cavity is "floored" having not only lateral surfaces but floor surfaces, it has now been found that the translational movement does not always give rise to uniform machining performance all over the surfaces of the cavity. The machined chips, gases and other discharge products can in general be carried away from the lateral gap sites relatively easily but tend to accumulate in the floor regions with the result that arcing or short-circuiting conditions are likely to be brought about. Irregularities in gap product distribution and machining performance also result when the tool electrode or the cavity has both relatively smooth-sloping and relatively intricate regions. In general, such irregularities have been found to be encountered inasmuch as a cavity to be finished commonly includes local areas which are geometrically different.

Objects of the Invention

The present invention seeks to provide a novel and improved EDM method and apparatus of the type described whereby stability-improved and equalized machining performance is obtained throughout the total areas of a cavity to be finish-machined in the workpiece.

Summary of the Invention

In accordance with the present invention there is provided, in a first aspect thereof, an EDM method of machining the surfaces of a cavity in an electrically conductive workpiece, which method comprises the steps of: (a) feeding at least partially into the cavity an electrode assembly comprising a plurality of segmented electrodes having their respective machining surfaces which collectively form a contour complementary or corresponding in shape to the cavity, the segmented electrodes being supported so as to be generally spaced apart from and movable relative to, each other in the assembly; and (b) electrically energizing the segmented electrodes individually with respect to the workpiece while individually displacing the segmented electrodes, generally independently of one another, relative to the workpiece, along their respective predetermined paths of translational motion, thereby permitting electrical discharges to develop between each of the surfaces of the cavity and the machining surface of each such segmented electrode brought proximate thereto across a fluid-filled machining gap during the individual translational motion thereof.

The invention also provides, in a second aspect thereof, an EDM apparatus for machining the surfaces of a cavity in an electrically conductive workpiece, which apparatus comprises: an electrode assembly comprising a plurality of segmented electrodes having their respective machining surfaces which collectively form a contour corresponding in shape to the cavity, the segmented electrodes being supported so as to be generally spaced apart from and movable relative to, each other in the assembly; power supply means for electrically energizing the segmented electrodes individually with respect to the workpiece; and a plurality of drive means operable independently of one another, relative to the workpiece, along their respective predetermined paths of translational motion, whereby electrical discharges develop between each of the surfaces of the cavity and the machining surface of each of the segmented electrodes brought proximate thereto across a fluid-filled machining gap during the individual translational motion thereof.

Brief Description of the Drawing

These and other features of the present invention as well as advantages thereof will become more readily apparent from a reading of the following description of a certain embodiment thereof when taken with reference to the accompanying drawing in which:

FIG. 3 is a circuit diagram, in block form, illustrating a drive system for effecting the respective translational motions of the individual segmented electrodes in the assembly.

Specific Description

Figure 1:
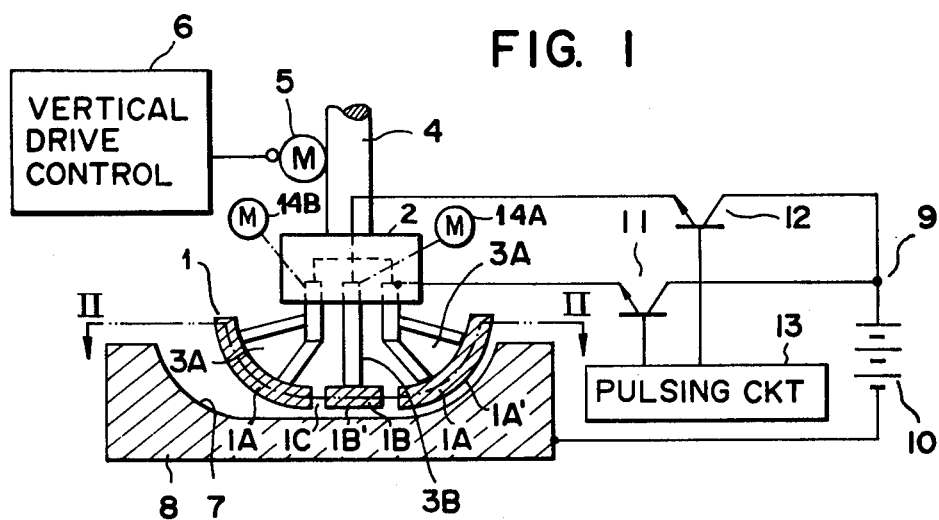
FIG. 1 is a side view in section diagrammatically illustrating an electrode assembly according to the invention, shown with a machining power supply system for individually energizing segmented electrodes constituting the electrode assembly.
Figure 2:
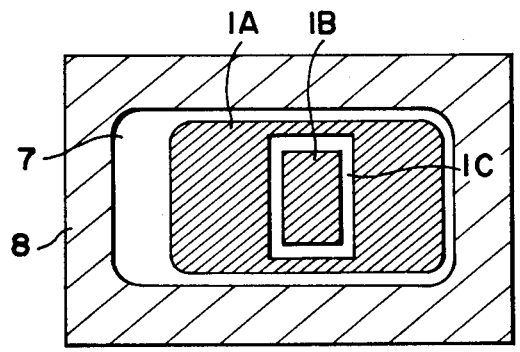
FIG. 2 is a sectional view, taken along line II-II of FIG. 1, diagrammatically illustrating two segmented electrodes in the assembly in machining the surfaces of a cavity in the workpiece.

Referring now to the drawing, first to FIGS. 1 and 2, an electrode assembly 1 according to the invention comprises segmented electrodes which may be two as shown and are identified by 1A and 1B. These segmented electrodes are supported so as to be movable relative to each other on a carriage 2 by means of support members 3A and 3B, respectively. It is seen that the electrode segment 1B is arranged at a center of the assembly 1 and surrounded by the external or peripheral electrode segment 1A with a spacing 1C provided therebetween. The segmented electrodes 1A and 1B are formed with their respective machining surfaces 1A' and 1B' preshaped to collectively form an imaginary contour which corresponds in shape to a cavity 7 in an electrically conductive workpiece 8. The carriage 2 is securely supported by a spindle 4 which is driven by a motor 5 to displace the electrode assembly 1 vertically. The motor 5 is energized by a vertical-drive control unit 6. By this latter unit, it is shown that the electrode assembly 1 is positioned in spaced juxtaposition with the recess or cavity 7 previously machined in the conductive workpiece 8.

An EDM power supply 9 shown comprises a DC source 10 and power switches 11 and 12, each shown by a transistor, which are intermittently turned on and off by a pulsing circuit 13 for connecting one pole of the DC source 10 individually to the electrode segments 1A and 1B, respectively. The other pole of the DC source 10 is electrically connected to the workpiece 8. The switches 11 and 12 operate in response to a succession of signal pulses furnished from the pulsing circuit 13 so that they are turned on and off to provide a succession of EDM pulses between each of the electrode segments 1A and 1B and the workpiece 8 across a respective machining gap filled with an EDM machining fluid such as kerosine or water liquid supplied by one or more nozzles and in which the electrode segments 1A and 1B and the workpiece 8 are immersed. The EDM pulses result in a succession of electrical discharges across the machining gap to electroerosively remove material from the workpiece 8.

The cavity 7 has been rough machined by EDM in the workpiece 8. To this end, the same segmented electrode assembly 1 or a separate, unitary electrode having a contour complementary in shape to the cavity 7 may be used. In the rough EDM step, the motor 5 is driven by the vertical-drive control 6 to advance such an electrode or electrode assembly vertically until a desired depth of material removal for the cavity 7 is attained in the workpiece 8.

In the finish-machining operation according to the present invention, the external or peripheral electrode segment 1A and the inner or central electrode segment 1B are individually displaced, generally independently of each other, along their respective paths of translational movement. It should be appreciated that the translational movement is referred to throughout the specification and the appended claims as an orbiting or orbital motion, although such movement of translation is not, in all cases, a truly or geometrically orbiting motion along a curvilinear path. The expression "orbiting" or "orbital" motion has been selected for the sake of simplification and because it has apparently acquired significance in the art by analogy with other methods and apparatus for removing material from a workpiece, such as orbital sanders and grinders wherein the tool is transversely oscillated or translated during feed of the tool towards and into the workpiece, whether such motion of translation or oscillation of the tool is effected along a linear path, a curvilinear path, a square path, or a rectangular path.

A drive system for individually displacing the electrode segments 1A and 1B, independently of each other, is shown in FIG. 3. In this FIGURE, the support members 3A and B which securely support the electrode segments 1A and 1B, respectively, are shown to be movable in an X-Y plane and an X'-Y' plane in parallel therewith, respectively, both of which planes are orthogonal to the axis of the spindle 4 (FIG. 1) or to the Z-axis. Here, the X'- and Y-axes of the X'-Y' coordinate system are conveniently arranged in parallel with the X- and Y-axes, respectively, of the X-Y coordinate system. Thus, the support member 3A is translationally displaced by a pair of motors, one of which is identified at 14A, to translationally displace the electrode segment 1A in the X-Y plane whereas the support member 3B is translationally displaced by a pair of motors, one of which is identified at 14B, to translationally displace the electrode segment 1B in the X'-Y' plane. The motor 14A are energized via amplifiers 15A by their respective driver circuits 16A whereas the motors 14B are energized via amplifiers 15B by their respective driver circuits 16B. The rotation of each motor 14A, 14B is sensed by an encoder 17A, 17B which acts on the driver circuit 16A, 16B.

The four driver circuits 16A, 16B for their respective four motors 14A, 14B are furnished with their respective operating inputs from a common interface 18 having signals stored therein which are required for both velocity control and interpolation. These signals are distributed into command pulses required to drive the motors 14A and the motors 14B. Each of the driver circuits 16A, 16B includes a D/A converter responsive both to the command pulses and the rotation sensing pulses from the encoder 17A, 17B to provide differentiated count pulses which are fed via the amplifier 15A, 15B to the individual motor 14A, 14B. The signals to the interface 18 are derived from a central processing unit (CPU) 19 via an input/output unit 20. A memory unit 21 including ROMs and RAMs is operatively coupled to a junction between the central processing unit 19 and the input/output unit 20. The system further includes a panel controller 22, a key-board 23 and display 24.

In operation of the system, a desired path of translational movement is keyed in by the key-board 23 for each of the electrode segments 1A and 1B. The keyed-in information is processed by the central processing unit 19 to provide outputs at the interface 18 so that the interpolated signal pulses are applied to the driver circuits 16A, 16B. Thus, the motors 14A are driven to displace the support member 3A along the X- and Y-axes to translationally displace the electrode segment 1A along a preselected key-in path with a preselected key-in velocity. The motors 14B are driven to displace the support member 3B along the X'- and Y'-axes to translationally displace the electrode segment 1B along a preselected key-in path with a preselected key-in velocity. Not only are these paths different from one another, but it is desirable in general that these velocities be also different from one another according to the invention. In their respective translational movements, the external or peripheral electrode segment 1B is cyclically orbited with a greater amplitude and the internal or central electrode segment 1A is cyclically orbited with a smaller amplitude. Depending on the shape of the cavity, it is also possible to cyclically orbit the external or peripheral electrode segment 1B with a smaller amplitude while cyclically orbiting the inner or central electrode segment 1A with a greater amplitude.

At any event, since the electrode assembly 1 has its segmented electrodes 1A and 1B which are generally spaced apart from each other and movable relative to each other, it is possible to individually control their respective translational movements depending on the particular shape of the cavity 7 so that uniform machining performance results all over the surfaces of the cavity 7. For example, when the cavity has two or more geometrically distinct regions, e.g. a relatively smooth-sloping region and a region which is relatively intricate in shape, the electrode segment proximal to the former region may be translationally moved with an amplitude of 1 to 5 mm and the electrode segment proximal to the latter region may be translationally moved with an amplitude of 1 mm or less.

It should be appreciated that the number of electrode segments into which the assembly is divided is not limited to two as illustrated and described. Furthermore, various other manners of dividing the electrode assembly into mutually spaced-apart and movable electrode segments are possible. It is also desirable that each electrode segment in its prescribed translational movement be servo-controlled in respect of the velocity and direction, independently of the other or, in response to the respective gap condition.

What is claimed is:

1. An EDM method of machining the surfaces of a cavity in an electrically conductive workpiece, the method comprising the steps of:
   (a) bringing at least partially into a cavity in an electrically conductive workpiece an electrode assembly comprising a plurality of segmented electrodes having their respective machining surfaces which collectively form a contour corresponding in shape to said cavity, said segmented electrodes being supported so as to be generally spaced apart and movable relative to each other in said assembly; and
   (b) electrically energizing said segmented electrodes individually with respect to said workpiece while individually displacing said segmented electrodes, generally independently of one another, relative to said workpiece, along respective predetermined paths of translational motion, thereby permitting electrical discharges to develop between each of said surfaces of the cavity and the machining surface of each of said segmented electrodes brought proximate thereto across a fluid-filled machining gap during said individual translational motion thereof.

2. The method defined in claim 1 wherein said segmented electrodes are individually displaced in step (b) along said respective paths which lie in a plane substantially orthogonal to the direction in which said assembly is brought in step (a).

3. The method defined in claim 2 wherein said assembly is brought in step (a) by machining by electrical discharges said cavity in said workpiece while relatively displacing said electrode assembly electrode and said electrically conductive workpiece.

4. The method defined in claim 1, further comprising: in step (b) the step of controlling the respective amplitudes of the translational movements of said segmented electrodes in accordance with the particular geometrical characteristics of those portions of the cavity with which they are juxtaposed across their respective machining gaps.

5. The method defined in claim 4 wherein said portions include a relatively smooth stoping region and a region which is relatively intricate in shape, comprising: in step (b) translationally displacing that of said segmented electrodes which is juxtaposed with the former region with a first amplitude while translationally displacing that of said segmented electrodes which is juxtaposed with the latter region with a second amplitude which is smaller than said first amplitude.

6. The method defined in claim 1, further comprising: in step (b) servo-controlling the positions of said segmented electrodes, independently from one another, in response to their respective machining gap conditions.

7. The method defined in claim 4, further comprising: in step (b) servo-controlling the positions of said segmented electrodes, independently from one another, in response to their respective machining gap conditions.

8. An EDM apparatus for machining the surfaces of a cavity in an electrically conductive workpiece, the apparatus comprising:
   an electrode assembly comprising a plurality of segmented electrodes having their respective machining surfaces which collectively form a contour corresponding in shape to a cavity, said segmented electrodes being supported so as to be generally spaced apart and movable relative to each other in said assembly;
   power supply means for electrically energizing said segmented electrodes individually with respect to said workpiece; and
   a plurality of drive means operable independently of one another for individually displacing said segmented electrodes, generally independently of one another, relative to said workpiece, along respective predetermined paths of translational motion,
   whereby electrical discharges develop between each of said surfaces of the cavity and the machining surface of each of said segmented electrodes brought proximate thereto across a fluid-filled machining gap during said individual translational motion thereof.

9. The apparatus defined in claim 8 wherein said electrode assembly is carried by a spindle so as to be movable in the direction of its axis to machine said cavity in said workpiece and said drive means are adapted to translation displace said segmented electrodes individually along said predetermined paths which lie in a plane substantially orthogonal to said direction.

10. The apparatus defined in claim 9 wherein said segmented electrodes comprise an outer electrode segment which is arranged about said axis and an inner electrode segment which is surrounded by said outer electrode segment across a spacing.

11. The apparatus defined in claim 10 wherein said outer and inner electrode segments are securely carried by first and second support members, respectively, in said electrode assembly and said plural drive means include a first pair of motors and a second pair of motors which pairs are drivingly coupled with said first and second support members, respectively.

* * * * *